Patented May 22, 1934

1,959,466

UNITED STATES PATENT OFFICE 1,959,466

DEHYDRATED FLOUR MIX AND PROCESS OF MAKING SAME

John D. Duff, Pittsburgh, and Louis E. Dietrich, Crafton, Pa., assignors to P. Duff & Sons, Inc., a corporation of Pennsylvania No Drawing. Application June 13, 1933, Serial No. 675,646

14 Claims. (Cl. 99—10)

This invention relates to a process of making a dehydrated flour mix and the product thereof for use in making pastry products and is in part a continuation of our copending application 501,468, filed December 10, 1930.

In our aforesaid copending application we have pointed out the disadvantages inherent in making ordinary pastry products wherein a large number of ingredients must be used and hence a complete stock of materials kept on hand. As pointed out this is not only expensive and inconvenient but necessitates careful measurements and mixing together with, of course, the necessary provision of suitable measuring and mixing apparatus. The accepted methods, moreover, are unsatisfactory due to the frequent poor results or failures which represent a serious loss of time, money, materials and energy.

One of the objects of the present invention is to simplify the making of pastry products in an economical manner and at the same time obviating unsatisfactory results or failures.

Another object is to so treat and compound the materials from which the pastry product is to be made that a product is secured which can be readily converted into the desired pastry product merely by adding moisture, such as in the form of milk or water, and then cooking or baking.

A further object is to provide a process of the above character wherein the process is still further simplified and facilitated by forming a dough by adding only a portion of the ultimate amount of flour to be added to an emulsion formed from molasses and shortening, with or without salt and sugar, and thereafter adding the balance of the flour and the remaining predetermined dry ingredients.

Other and further objects and advantages will be understood by those skilled in this art or will be apparent or pointed out hereinafter.

Assuming purely for the purpose of example that we wish to form a flour which is adapted to make a gingerbread by adding milk or water to the flour and then cooking or baking the same, we produce the mixture by the following process making use of the following ingredients in substantially the following proportions:

| | Pounds. | Per cent. |
|---|---|---|
| Wheat flour | 100 | 43.0 |
| Molasses | 100 | 43.0 |
| Sugar | 11 | 4.8 |
| Shortening | 11 | 4.8 |
| Salt | ½ | 0.2 |
| Baking soda | 3 | 1.3 |
| Powdered whole egg | 6 | 2.6 |
| Powdered ginger | ½ | 0.2 |
| Powdered cinnamon | ½ | 0.1 |

The amounts of these ingredients are purely illustrative or typical and not limitative since any one or all of them may be varied within relatively wide limits depending upon the conditions encountered and upon the precise nature of the product to be made as well as the characteristics which it is desired the product shall have.

Of the above ingredients in substantially the proportions set forth we first place the molasses, shortening, sugar and salt in the bowl of the dough mixing machine wherein they are suitably agitated while heat is simultaneously applied to the said ingredients, and such heat may be added in any convenient way such as by the insertion of a steam coil into the bowl of the mixing machine or by using a jacketed bowl within which steam or other heating medium may be circulated, or by other suitable means. The heating and agitation are continued until the shortening is thoroughly melted and until an emulsion is formed at least between the molasses and the shortening. The sugar and salt when present dissolve in the molasses and the resultant emulsion is a stable one containing all these ingredients.

As pointed out in our copending application the sugar and salt may be omitted at this point and added later in dry form, but whether or not the sugar and salt are present a very uniform emulsion is made by the agitation and heat and consequently a thoroughly homogeneous mixture of the materials so far added is obtained.

When such a homogeneous stable emulsion has been attained the heating may be discontinued and we then add certain proportions of the flour thereto while at the same time kneading the flour and the emulsion to form a dough. In the present process, however, we form a relatively thin dough which is made by gradually adding the flour until roughly one-half of the total amount of flour to be added has been introduced. While we may add, as stated, approximately one-half of the total amount of flour to be used this amount may vary from about 40% to about 75% of the total flour to be added and in this way we produce a thinner dough than if all the flour had been added at this stage of the process.

It is clear that the relative thinness of the dough may be controlled by the percentage of the total flour which is omitted and in some cases the dough may be so thin that it will run. This results in a simplification and speeding up of the process due to the fact that such a dough may be dried more quickly and in relatively greater amounts.

We next dry the dough and the drying may be carried out in a number of ways. We may, for example, roll the dough into a thin sheet which is dried by subjecting it to the influence of a current or blast of warm air or we may divide the dough mechanically into small lumps which may be placed on trays or dried in suitably heated drying cabinets. We may also force the dough through steel dies to form thin strands or ribbons, e. g., like spaghetti, and these strands or ribbons may be dried in a suitable apparatus.

In a preferred procedure, however, we expedite the drying of the dough by subjecting it to a mild heat in a suitable vacuum drier of any preferred type such as the shelf type, the rotary spray type or other type, or to any suitable combination of mild heat and vacuum to exercise certain beneficial effects on the ingredients and to cut down the time of drying. In a typical instance we utilize a vacuum drier of the shelf type operating at a vacuum of about 28 to 29 inches and at a temperature in the neighborhood of 160 to 170° F., and under such conditions that there will be no cooking or baking of the dough and no destruction of those characteristics of certain of the ingredients, such as the inherent moisture content or the gluten of the flour, which act to bring about the normal cooking effects at the proper time.

In other words, by the use of heat and vacuum as set forth we place the ingredients in an intermediate physico-chemical association ready for and favoredly disposed to those final chemical and physical changes of a complex and not fully understood or known nature which occur in baking or cooking. Under the stated conditions of temperature and vacuum the drying operations can be readily effected in about two or three hours or less. We believe that the flour may act as a stabilizing agent for the emulsion of molasses and shortening or in some other peculiar way, but we do not intend to limit ourselves to this or any other particular theory and although we do not fully understand exactly what takes place during our process we have nevertheless the conviction that a new and unexpected physico-chemical interrelationship of the ingredients has been effected by the special processing above set forth. We believe such due to the fact that the resultant hard, dry mass has perfect homogeneity and different nature and characteristics, as compared to the materials of which it is made.

After the dough is dried, by whatever drying process is used, a hard, dry, intermediate mass results in which the various ingredients are individually unidentifiable as such and this is next ground to a powder. We may do this, for example, in a suitable grinding mill of any desired or available type. The important requisite is that the dough shall be reduced to a suitable state of fineness or sub-division and we have found that grinding to about 20 mesh produces a satisfactory "flour" or powder.

Having formed the powder according to the foregoing description our flour mix of the present invention is practically complete as all that we then need to do is thoroughly to mix in the remaining ingredients in a dry form and in a suitable state of sub-division. This may be done, for example, by placing all the materials in a suitable revolving mixing drum or we may otherwise mix them in any desirable way as by raking or scooping the various ingredients back and forth on a slab until they are thoroughly mixed. It is to be understood that in completing the mix we add the balance of the flour which may, however, be added during the grinding of the hard mass, if preferred, and which was omitted when the dough was formed and also the other predetermined dry ingredients such as those tabulated above.

The above is intended more in an illustrative than in a limitative manner and we contemplate various modifications, substitutions, additions or omissions depending upon the precise product desired and the other conditions encountered. We can, for example, make different types of flours such as brown breads, spice cakes, bran cakes, devil's food cakes and the like by suitable variation in the percentages of the above stated ingredients or by omitting certain of them where their characteristics are unnecessary for the particular type of product. In this connection we again refer to our aforesaid copending application.

While certain of the ingredients are more or less hygroscopic and/or non-keeping in nature, nevertheless our product is not harmfully hygroscopic and has excellent keeping qualities. Furthermore, our process entraps all volatiles such as those in the molasses and therefore produces an unexpectedly full-flavored and excellent product in all respects.

We may use for the shortening a hydrogenated edible vegetable oil or fat, such as cotton seed oil, etc., or a suitable animal fat such as lard and such may be in a semi-solid or liquid form if desired and thus of especially high grade so that the present process offers the additional advantage of utilizing especially high grade shortenings, which need not necessarily be hydrogenated and which accordingly still further improve the texture and flavor of the pastry product.

What we claim as new and desire to secure by Letters Patent is:

1. The process of making a dehydrated non-harmfully hygroscopic "flour" including the steps of forming an emulsion containing molasses and shortening, adding enough of the total flour to be added to form a thin dough, kneading said dough, drying and powdering the same, and thereafter mixing in the balance of the flour and other predetermined dry ingredients.

2. The process of making a dehydrated non-harmfully hygroscopic "flour" including the steps of forming an emulsion containing molasses and shortening, adding about 40–75% of the total flour ultimately to be added to form a dough, kneading the dough, drying and powdering the same, and thereafter mixing in the balance of the flour and other predetermined dry ingredients.

3. The process of making a dehydrated non-harmfully hygroscopic "flour" including the steps of forming an emulsion containing molasses and shortening, adding approximately 50% of the total flour ultimately to be incorporated to form a dough, kneading the dough, drying the same under mild heat and vacuum without cooking the dough, reducing the thus treated dough to a powder, and thereafter mixing in the balance of the flour and other predetermined dry ingredients.

4. The process of making a dehydrated flour including the steps of mixing molasses, shortening, sugar and salt and simultaneously heating and agitating the same to form a homogeneous emulsion discontinuing the heating, adding about 40 to 75% of the total amount of flour to be incorporated and forming a kneaded dough from these ingredients, drying said dough and reducing it to a powder and thereafter mixing in the unadded balance of the flour and the baking soda, powdered whole egg, powdered ginger and powdered cinnamon.

5. The steps, in a process of the character described, of making a hard dry mass adapted to be converted into a product from which a pastry product can be made by adding moisture and cooking including the steps of forming an emulsion of molasses and shortening, adding a portion of the total amount of flour to be incorporated but sufficient to make a dough and subsequently drying such dough to form the hard dry mass aforesaid.

6. The steps, in a process of the character described, of making a hard dry mass adapted to be converted into a product from which a pastry product can be made by adding moisture and cooking including the steps of forming an emulsion of molasses and shortening, adding a portion of the total amount of flour to be incorporated but sufficient to make a dough and subsequently drying such dough to form the hard dry mass aforesaid; thereafter grinding said hard mass and mixing in the unadded balance of the flour and the other predetermined dry ingredients to complete the mix.

7. A method of preparing a molasses cake flour adapted to be subsequently baked into an edible product consisting in first mixing molasses and a shortening under heat and agitation to produce a homogeneous emulsion in which the shortening is melted and thoroughly incorporated in the molasses, then adding a sufficient quantity of flour, less than the total amount of flour ultimately to be incorporated, to said emulsion to form a dough, stirring the added amount of flour into the emulsion under heat and then reducing the dough to a dry powder condition and finally adding the balance of the flour and a gasifying agent in a dry form thereto.

8. In a process of the character described, the steps of forming a homogeneous emulsion of molasses and shortening under heat and agitation, adding sufficient flour to said emulsion to form a dough, kneading said dough, drying said dough under mild heat and vacuum to form a hard dry intermediate mass, reducing this mass to a relatively fine state of subdivision, and completing the process by adding and mixing in dry powder condition the balance of the flour required and other predetermined dry ingredients.

9. The steps of emulsifying molasses and shortening under heat and agitation, adding a portion of the total flour to be incorporated sufficient to form a dough which may be then kneaded, drying the dough at about 160–170° F. under 28–29 inches of vacuum, to form a hard dry intermediate physico-chemically associated composition in which the whole of the molasses is entrapped, and then reducing the same to a powder condition to which are then added the balance of the flour and predetermined remaining dry ingredients.

10. In a process of the character described, the steps of forming a homogeneous emulsion of molasses and shortening under heat and agitation, adding sufficient flour to said emulsion to form a dough, kneading said dough, drying said dough under mild heat and vacuum to form a hard dry intermediate mass, reducing this mass to a relatively fine state of subdivision, and completing the process by adding and mixing in dry powder condition the balance of the flour required and other predetermined dry ingredients, the total flour content being substantially equal in weight to the molasses content.

11. The steps of emulsifying molasses and shortening under heat and agitation, adding a portion of the total flour to be incorporated sufficient to form a dough which may be then kneaded, drying the dough at about 160–170° F. under 28–29 inches of vacuum, to form a hard dry intermediate physico-chemically associated composition in which the whole of the molasses is entrapped, and then reducing the same to a powder condition to which are then added the balance of the flour and predetermined remaining dry ingredients, the total flour content being substantially equal in weight to the molasses content.

12. A dehydrated mix adapted for making pastry products by adding moisture thereto and cooking or baking comprising a pulverized hard, dry mass, containing a dried dough which consists of an emulsion of molasses and shortening to which flour has been added, and predetermined dry ingredients, the mix being characterized by non-harmful hygroscopicity and good keeping qualities although it contains normally hygroscopic and non-keeping constituents.

13. A process of making a dehydrated flour mix adapted to be converted into an edible product by adding liquid and baking comprising the steps of emulsifying molasses and shortening, converting such to a thin dough by working in sufficient flour less than the total amount of flour to be added, dehydrating the dough to form a hard dry intermediate mass, grinding such mass to a flour-like consistency and mixing in predetermined dry ingredients, including the balance of the flour, to complete the mix.

14. A process of making a dehydrated flour mix adapted to be converted into an edible product by adding liquid and baking comprising forming a stabilized emulsion of molasses and shortening under heat and agitation, combining into a new substantially dry physico-chemical intermediate compound the said emulsion and a portion of flour less than the total amount of flour to be incorporated by working up the emulsion and said portion of flour into a thin dough and dehydrating the dough without affecting its subsequent capacity to be baked, thereafter grinding said intermediate compound to a suitable state of subdivision and thoroughly mixing in the balance of the flour and other predetermined dry ingredients according to and to complete the ultimate mix.

JOHN D. DUFF.
LOUIS E. DIETRICH.